United States Patent
Abel et al.

(10) Patent No.: US 10,338,246 B1
(45) Date of Patent: Jul. 2, 2019

(54) METHOD AND SYSTEM FOR MICROSEISMIC EVENT WAVEFRONT ESTIMATION

(71) Applicant: Seismic Innovations, Menlo Park, CA (US)

(72) Inventors: Jonathan S. Abel, Menlo Park, CA (US); Yoo Hsiu Yeh, Newark, CA (US); Sean A. Coffin, Redwood City, CA (US)

(73) Assignee: Seismic Innovations, Menlo Park, CA (US)

( * ) Notice: Subject to any disclaimer, the term of this patent is extended or adjusted under 35 U.S.C. 154(b) by 93 days.

(21) Appl. No.: 15/251,812

(22) Filed: Aug. 30, 2016

Related U.S. Application Data

(60) Provisional application No. 62/211,893, filed on Aug. 31, 2015.

(51) Int. Cl.
  *G01V 1/28* (2006.01)
  *G01V 1/36* (2006.01)
  *G01V 1/40* (2006.01)

(52) U.S. Cl.
  CPC .......... *G01V 1/288* (2013.01); *G01V 1/36* (2013.01); *G01V 1/40* (2013.01); *G01V 2210/123* (2013.01); *G01V 2210/32* (2013.01); *G01V 2210/65* (2013.01)

(58) Field of Classification Search
  CPC ...... G01V 1/288; G01V 2210/65; G01V 1/28; G01V 1/36; G01V 2210/123; G01V 2210/32

USPC .............................................. 367/21, 38, 62
See application file for complete search history.

(56) References Cited

U.S. PATENT DOCUMENTS

| | | | |
|---|---|---|---|
| 3,453,614 A | 7/1969 | Bose | |
| 3,460,013 A | 8/1969 | Gaylor | |
| 4,683,556 A | 7/1987 | Willis | |
| 5,583,825 A | 12/1996 | Carrazzone et al. | |

(Continued)

FOREIGN PATENT DOCUMENTS

| | | |
|---|---|---|
| EP | 1 485 733 B1 | 12/2011 |
| EP | 2 784 552 A2 | 10/2014 |

(Continued)

OTHER PUBLICATIONS

Coffin, et al., "On the Accuracy of Microseismic Event Location Estimates", undated white paper, pp. 1-18.

(Continued)

*Primary Examiner* — Ian J Lobo
(74) *Attorney, Agent, or Firm* — Foley & Lardner LLP

(57) ABSTRACT

In the field of seismic data analysis, the problem of estimating features of a microseismic event waveform, detected at the sensors of a geophone array in the presence of background seismic energy and sensor noise, is considered. Embodiments of the present disclosure provide a method and system for estimating wavefront arrival times and polarizations across the sensors of an array, while simultaneously extracting the associated event sensor waveforms from the seismic background. The resulting waveform estimates are estimated in such a way that estimation errors are expected to be noise-like, and free of any systematic changes in the magnitude or phase of the arriving wavefronts.

18 Claims, 11 Drawing Sheets

(56) References Cited

U.S. PATENT DOCUMENTS

| | | | |
|---|---|---|---|
| 5,996,726 A * | 12/1999 | Sorrells | G01V 1/02 175/40 |
| 7,391,675 B2 | 6/2008 | Drew | |
| 7,643,374 B2 | 1/2010 | Plona et al. | |
| 8,107,317 B2 | 1/2012 | Underhill et al. | |
| 8,649,980 B2 | 2/2014 | Gulati | |
| 8,705,316 B2 | 4/2014 | Thornton et al. | |
| 8,800,652 B2 | 8/2014 | Bartko et al. | |
| 2005/0060099 A1 | 3/2005 | Sorrells et al. | |
| 2008/0159075 A1 | 7/2008 | Underhill et al. | |
| 2009/0010104 A1 | 1/2009 | Leaney | |
| 2009/0125240 A1 | 5/2009 | Den Boer et al. | |
| 2010/0262373 A1 | 10/2010 | Khadhraoui et al. | |
| 2010/0312480 A1 | 12/2010 | Hansteen et al. | |
| 2011/0091078 A1 | 4/2011 | Kherroubi et al. | |
| 2011/0120702 A1 | 5/2011 | Craig | |
| 2011/0317518 A1 | 12/2011 | Guigne et al. | |
| 2013/0144532 A1 | 6/2013 | Williams et al. | |
| 2013/0215717 A1 | 8/2013 | Hofland et al. | |
| 2014/0019057 A1 * | 1/2014 | Diller | G01V 1/288 702/16 |
| 2014/0112099 A1 | 4/2014 | Hofland et al. | |
| 2014/0278120 A1 | 9/2014 | Kahn et al. | |
| 2014/0288840 A1 * | 9/2014 | Vermilye | G01V 1/288 702/16 |
| 2015/0226868 A1 * | 8/2015 | Cieplicki | G01V 1/307 702/14 |

FOREIGN PATENT DOCUMENTS

| | | |
|---|---|---|
| GB | 2 450 707 A | 1/2009 |
| GB | 2 525 996 A | 11/2015 |
| WO | WO-2004/070424 | 8/2004 |
| WO | WO-2005/106533 | 11/2005 |
| WO | WO-2008/124759 | 10/2008 |
| WO | WO-2009/026979 A1 | 3/2009 |
| WO | WO-2010/116236 | 10/2010 |
| WO | WO-2011/077223 | 6/2011 |
| WO | WO-2011/077227 A2 | 6/2011 |
| WO | WO-2012/085848 | 6/2012 |

OTHER PUBLICATIONS

Bahorich et al., "3-D Seismic Discontinuity for Faults and Stratigraphic Features: The Coherence Cube", The Leading Edge, Oct. 1995, pp. 1053-1058.
Chopra et al., "Curvature Attributes Delineate Subtleties", E & P, Sep. 2006, pp. 72-73.
Culver et al., "Interpretation of Multipath-Analysis Localizations of Microseismic Data: An Alberta Montney Shale Example", undated white paper, 5 pages.
Eisner, et al., "Comparison of Surface and Borehole Locations of Induced Seismicity", Geophysical Prospecting, 2010, 58, 809-820.
Eisner, et al., "Determination of S-wave Slowness from a Linear Array of Borehole Receivers", Geophys. J. Int. (2009) 176, 31-39.
Eisner, et al., "Uncertainties in Passive Seismic Monitoring", The Leading Edge, Jun. 2009, pp. 648-655.
Fuller et al., "Seismic Wave Phenomena and Implications for Accuracy of Microseismic Results", CSEG Recorder, Nov. 2010, pp. 36-37.
Grenchka, et al., "Data-Acquisition Design for Microseismic Monitoring", The Leading Edge, Mar. 2010, pp. 1-5.
Hur, et al., "An Analytic Model for Microseismic Event Location Estimate Accuracy", Oct. 2011, 25 pages.
Hur et al., "An Analytic Model for Microseismic Event Location Estimate Accuracy", First Break, undated, 7 pages.
International Search Report and Written Opinion dated Sep. 25, 2013 for International Patent Application No. PCT/US2013/040191, 11 pages.
Kidney, et al., "Impact of Distance Dependent Location Dispersion Error on Interpretation of Microseismic Event Distributions", The Leading Edge, Mar. 2010, pp. 1-5.
Maxwell, et al., "Key Criteria for a Successful Microseismic Project", SPE Paper 134695, Sep. 2010, pp. 1-16.
Maxwell, et al., "Microseismic Location Uncertainty", CSEG Recorder, Apr. 2009, pp. 41-46.
International Search Report dated May 27, 2013 for International Patent Application No. PCT/US2013/022950, 1 page.
Rutledge, et al., "Hydraulic Stimulation of Natural Fractures as Revealed by Induced Microearthquakes", Carthage Cotton Valley Gas Field, East Texas, Geophysics, vol. 68, No. 2, 2003, pp. 1-37.
Roth et al., "Fracture Interpretation in the Barnett Shale, Using Macro and Microseismic Data", Frontiers and Innovation—CSPG CSEG SWLS Convention, 2009, pp. 1-4.
Zimmer et al., "Localization of Microseismic Events Using Headwaves and Direct Waves", SEG Expanded Abstracts 2010, pp. 2196-2200.

* cited by examiner

METHOD AND SYSTEM FOR MICROSEISMIC EVENT WAVEFRONT ESTIMATION

CROSS-REFERENCE TO RELATED APPLICATIONS

The present application claims priority to U.S. Prov. Appln. No. 62/211,893, filed Aug. 31, 2015, the contents of which are incorporated herein by reference in their entirety.

TECHNICAL FIELD

The present disclosure relates generally to analyzing microseismic events, and more particularly to techniques for estimating features of a wavefront associated with a microseismic event.

BACKGROUND

Passive localization of microseismic events is commonly used to monitor resource extraction processes such as hydraulic fracture stimulation, or "fracking." In a typical scenario, an array of geophones is positioned in a monitor well nearby the well undergoing treatment. The array records seismic energy released impulsively from induced failure events as fractures form. Arrival times and polarizations of P-waves and S-waves impinging the array, among other features, are used to estimate the location of each detected event. Additional information about the event, treatment, and seismic propagation environment is contained in the arriving waveforms. For example, the measure of seismic propagation loss, Q, may be estimated by analyzing the spectral content of arrivals as the wavefront propagates across the sensors of the array. Additionally, the event moment magnitude and its moment tensor may be estimated from arriving waveform features.

Co-pending U.S. patent application Ser. Nos. 13/598,580, 14/340,356 and 14/536,985, the contents of which are all incorporated by reference herein in their entirety, have dramatically advanced the state of the art by providing various techniques for analyzing and characterizing microseismic events utilizing sensor data such as data from an array of geophones as described above. However, certain challenges remain.

SUMMARY

Embodiments of the present invention provide a system and method for extracting event arrival waveforms and estimating sensor wavefront features such as arrival times and polarizations, which can operate in the presence of significant seismic background energy and which do not result in any systematic distortion of the arrival waveforms. According to certain aspects, an approach taken in the present invention is to recast the problem of suppressing the seismic background and sensor noise as one of estimating the arriving waveforms in a "noise" background. An aspect of this approach is to simultaneously estimate at each sensor pod wavefront features such as arrival times and polarizations, along with the arriving waveform itself.

In an embodiment of the present invention, recorded traces are time-aligned according to an estimate of the waveform moveout, and projected onto a low-dimensional space to estimate the arriving waveforms. In another embodiment, the estimated waveforms are correlated with the trace data to re-estimate wavefront arrival times, which in turn, are used in an iterative process to update the waveform estimates.

In other embodiments, the component traces for each sensor pod are combined according to an estimated event direction, forming a single oriented trace for each pod. In yet another embodiment, the component traces for each sensor pod are combined according to a direction at which the SNR is approximately maximized. In still another embodiment, the estimated waveforms are expanded to multi-component data according to the orientations used to generate the single-trace data used in estimating the waveforms and the event direction.

In further embodiments, the low-dimensional projection is an average of the time-aligned waveforms, scaled according to the inner product of the average and the portion of the trace data thought to contain the arrival. In another embodiment the average is weighted according to the SNR or energy of the time-aligned waveforms.

Yet another embodiment estimates wavefront arrival times and polarizations by correlating for each sensor pod a single estimated waveform with the pod trace data.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION OF THE PREFERRED EMBODIMENTS

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

According to certain general aspects, embodiments of the invention provide techniques for extracting event arrival waveforms and estimating sensor wavefront features such as arrival times and polarizations, which techniques can operate in the presence of significant seismic background energy and which do not result in any systematic distortion of the arrival waveforms.

Figure 1:
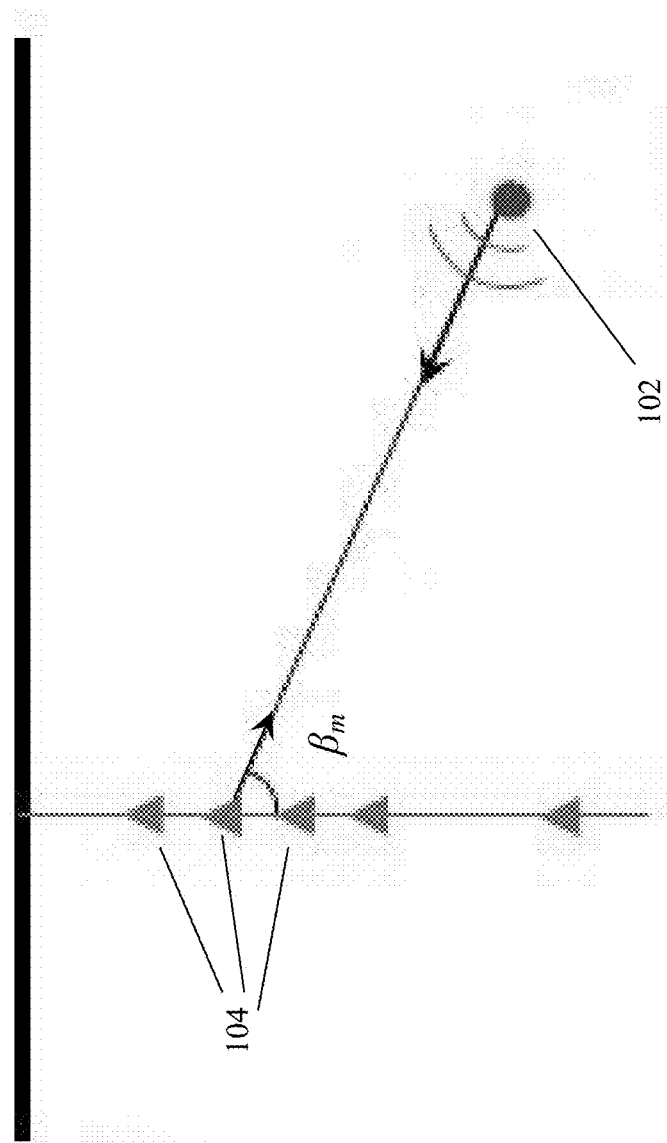
FIG. 1 is a block diagram illustrating an example application of embodiments of the invention.

FIG. 1 illustrates an example application of principles of the invention in a down-hole array of sensors.

Referring to FIG. 1, consider a source 102 of transient microseismic energy, such as energy resulting from a fracture event, located at an underground position relative to a set of M sensors (e.g. geophones) 104 at respective locations, for example different separated locations along a cable suspended in an underground bore hole. As shown, the orientation or polarization of a wavefront from source 102 arriving at the mth sensor 104 is $\beta_m$. It should be noted that a sensor 104 can be comprised of a "pod" of sensor components, such as sensor components respectively configured to detect energy along three orthogonal axes, in which case the orientation would also have three components.

According to certain aspects, the present inventors recognize that the wavefronts arriving at the sensors 104 from source 102 are often corrupted by significant seismic background energy and sensor noise, which obscures important event wavefront features. Processing of the sensor traces such as bandpass filtering or Wiener filtering is commonly performed to suppress frequency bands in which the event wavefront signal-to-noise ratio is poor (note that here "noise" refers to both the seismic background and sensor noise); however, in many cases such processing does not remove a sufficient amount of the seismic background to effectively understand details of the arriving wavefront. Other non-linear processing techniques, such as adaptive filtering methods, suppress noise effectively, but can alter the arriving waveforms in doing so.

According to certain aspects, therefore, embodiments provide a seismic trace processing method which can remove a significant amount of seismic background during an event wavefront arrival, while preserving important features of the arriving waveforms.

As in FIG. 1, consider an array of M sensors, each receiving signals $g_m(t)$, measured along one or more sensor components as a function of time t. The measured signal at sensor m is assumed to be an event waveform $s_m(t-\tau_m)$ arriving at time $\tau_m$ with polarization $\beta_m$ in additive noise $n_m(t)$ consisting of seismic background and sensor noise, $$g_m(t)=s_m(t-\tau_m)\beta_m^T+n_m(t) \quad (1)$$

where $\cdot^T$ denotes a matrix transpose. The goal is to estimate the arriving event waveforms $s_m(t)$ at each sensor m from the measured seismic traces $g_m(t)$; m=1 to M. It should be noted that for P-wave arrivals, $s_m(t)$ and $\beta_m$ will have one dimension or column, while for S-wave arrivals, $s_m(t)$ and $\beta_m$ can have two dimensions or columns. For clarity in the following, $s_m(t)$ and $\beta_m$ are treated as having one dimension or column, representing P-waves or S-waves polarized along a single direction. It will be apparent to those skilled in the art how to extend the invention described herein to the case of $s_m(t)$ and $\beta_m$ having two dimensions or columns.

Figure 2:
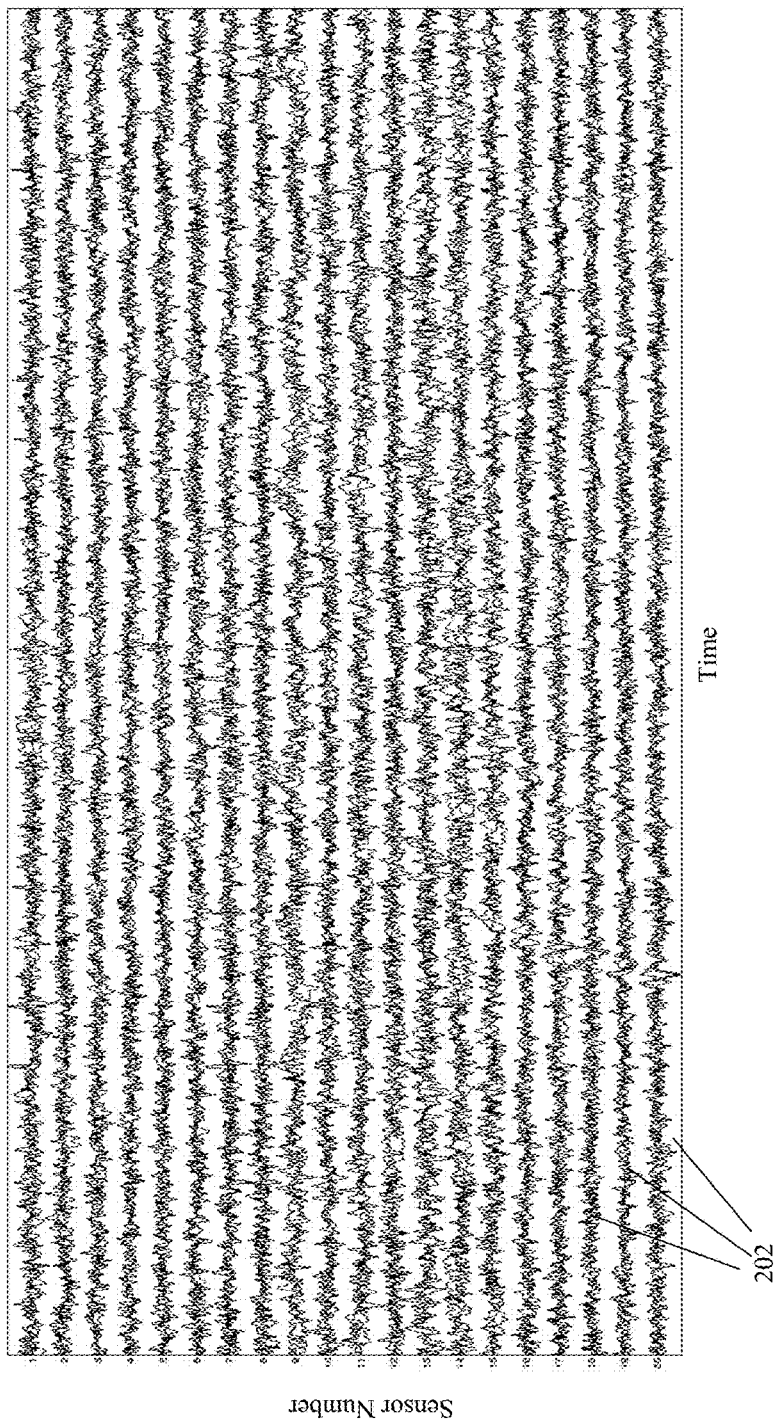
FIG. 2 is a plot illustrating raw traces from a sensor array such as that shown in FIG. 1.
Figure 3:
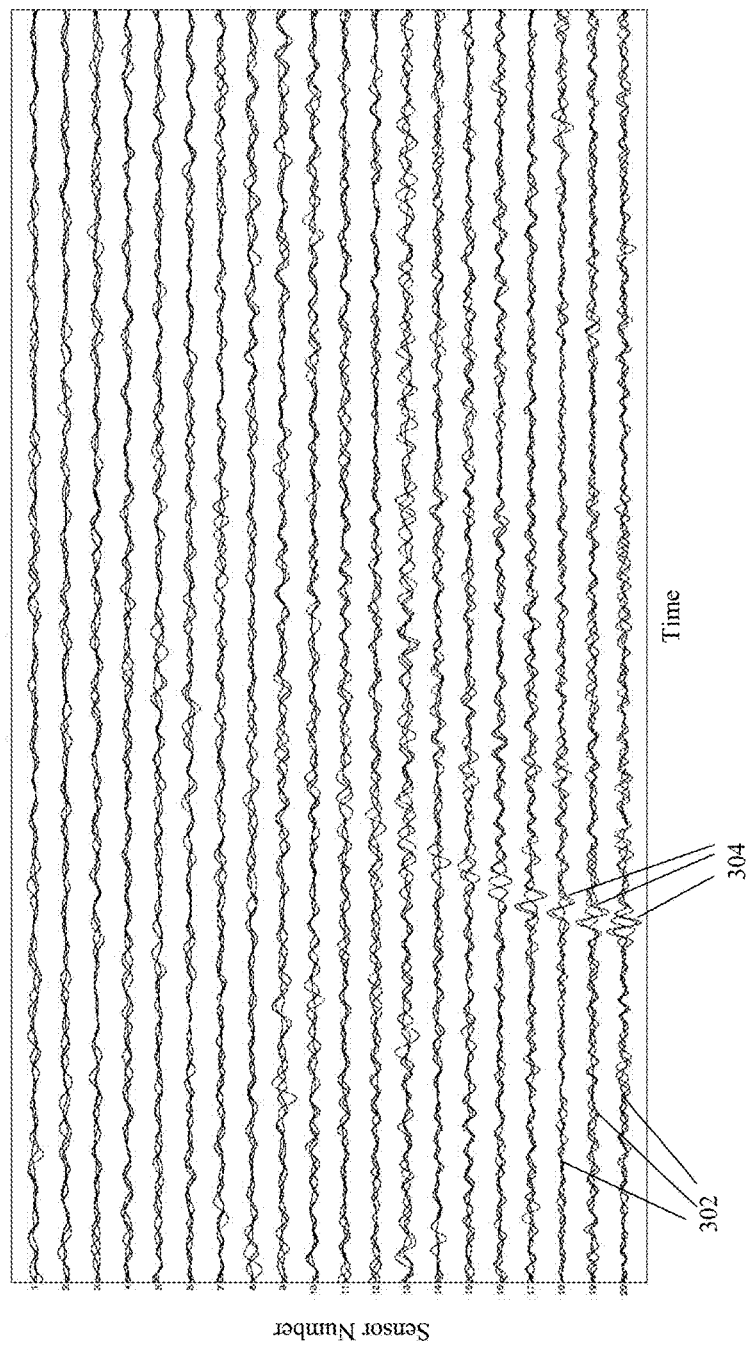
FIG. 3 is a plot illustrating traces such as those shown in FIG. 2 that have been bandpass filtered according to embodiments.

An example set of raw measured traces is shown in FIG. 2. In this example, there are M=20 three-component sensors (i.e. each sensor m generates a set of three traces 202), and a P-wave arrival is present in a background of seismic energy. It should be noted that the set of trace data can be received as a computer readable file in a standard or proprietary format such as SEG-D or SEG-Y, perhaps depending on the sensor manufacturer, and having a defined time duration such as a half-second or ten seconds. However, the principles of the invention are not limited to these examples. A conventional approach is to bandpass filter the trace data according to the arrival spectrum and seismic background, as seen in FIG. 3. Here, the applied bandpass filtering has been adjusted for the arriving wavefront so that the background is suppressed at frequencies where the SNR is less than 0 dB. Note that the arrivals 304 of the wavefront at each sensor is more prominent in traces 302 after bandpass filtering. While the bandpass filtering suppresses some of the seismic background and the arriving wavefronts are more clearly visible, important waveform features remain obscured.

Figure 4:
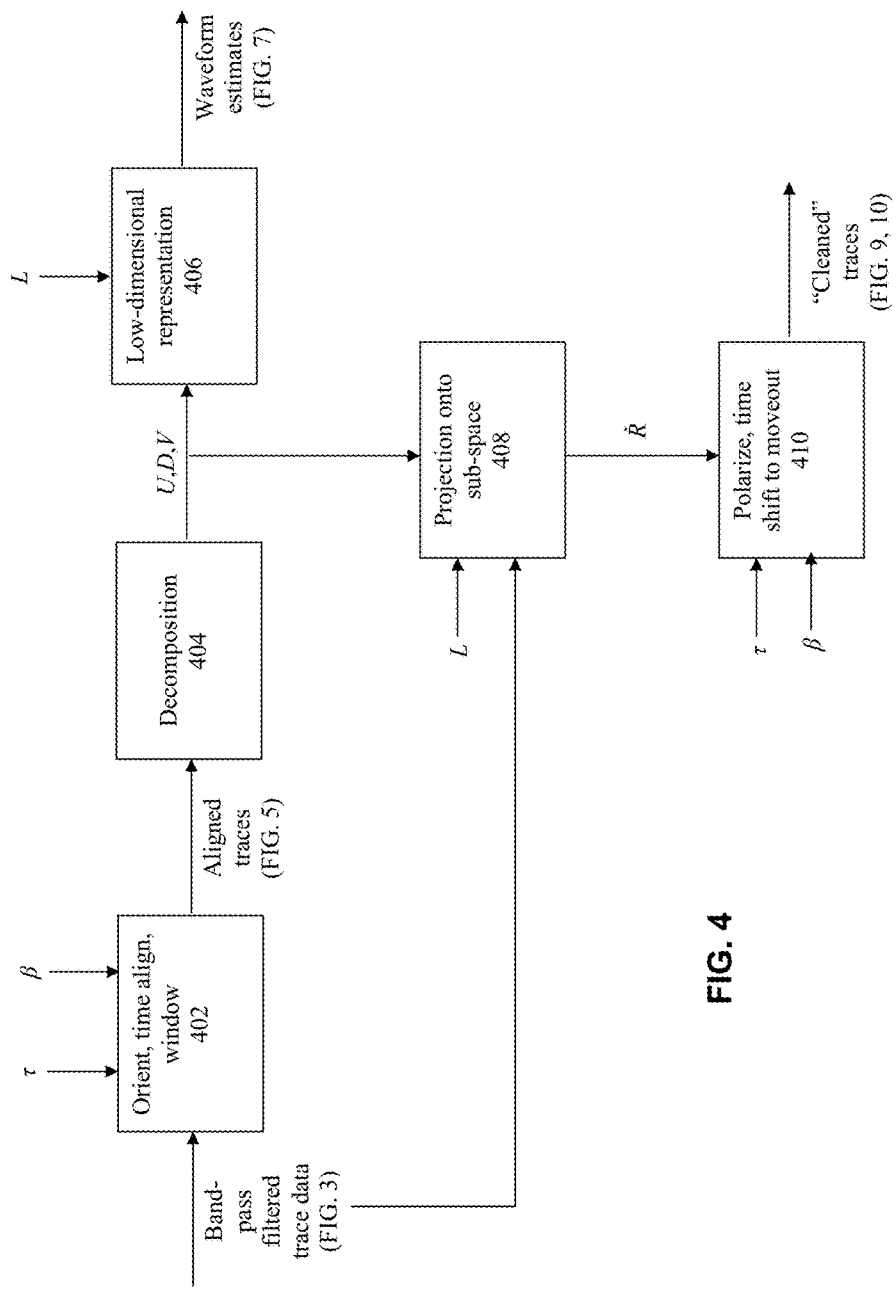
FIG. 4 is a functional block diagram illustrating an example system and method according to embodiments.

A functional block diagram of an example method and system for implementing aspects of embodiments of the invention is shown in FIG. 4. It should be known that FIG. 4 can be implemented using any combination of hardware and software using techniques that are known to those skilled in the art after being taught by the present disclosure. For example, an example system can be implemented using an x86 computer system loaded with software that implements the functionality described in connection with FIG. 4 and having a conventional graphics system and display for generating plots such as those provided in the figures, as well as a conventional file system for reading and saving files containing trace data. Many alternatives as possible.

Returning to FIG. 4, as shown in this example, the trace data that is received and processed is conventional bandpass filtered trace data such as that described above in FIG. 3. The filtered trace data is time aligned in block 402 according to an estimate of the arrival moveout so as to have the event wavefront arrive at all sensors simultaneously. More particularly, the respective arrival time $\tau_m$ for each sensor m is estimated with respect to a common time reference for each of the filtered traces. These initial estimates of $\tau_m$ can be performed using various techniques, such as those described in the co-pending applications. Then the trace data for each sensor is respectively shifted in time with respect to the common time reference by the respective time $\tau_m$.

Additionally in block 402, if the sensors contain multiple components, the respective traces from these components are combined into a single trace for each sensor. In one example, using an estimate for each respective polarization $\beta_m$, the data for each sensor is "pointed" in the source direction, so as to combine the multiple traces for each sensor into a single component and single trace. The initial estimate for $\beta_m$ (i.e. estimate of source location relative to the position of the sensor in the array) can be determined in various ways, such as those described in the co-pending applications.

In another possible example, a single trace for each sensor is generated by pointing each sensor in the direction at which it achieves its maximum SNR. It should be noted that SNR may be estimated by examining the signal level before and during the event arrival, and that the direction of maximum SNR may be found by a search over arrival directions. It should be further noted that the direction at which the maximum SNR is achieved is not necessarily determined by the source direction. This is because while the source energy is maximized when the sensor is oriented according to the source direction, the maximum is rather broad. By contrast, energy from a noise source is minimized when the sensor is oriented perpendicular to the noise source polarization, but the minimum is relatively narrow. As a result, the SNR maximizing orientation will often be more aligned relative to a dominant noise source than according to the source direction.

Figure 5:
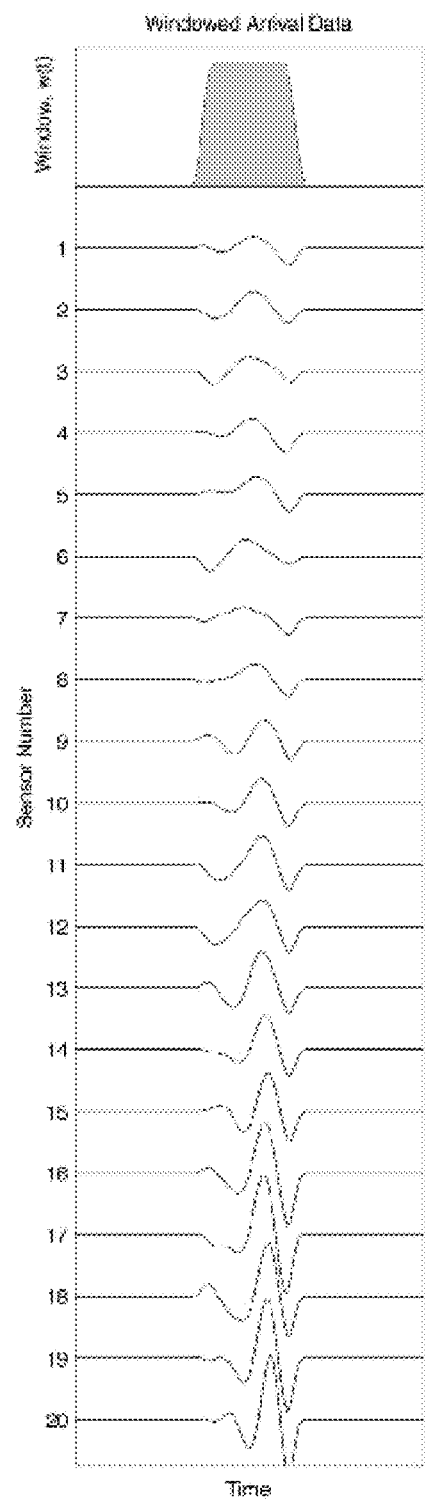
FIG. 5 is a plot illustrating time aligned, oriented and windowed versions of traces such as those shown in FIG. 3 according to embodiments.

Finally, in block 402, the set of time-aligned, oriented single traces is time-windowed to select the duration of trace data over which the wavefront appears at each sensor. An example of how block 402 processes the traces of FIG. 3 to be time-aligned, oriented, and windowed as described above is shown in FIG. 5.

Denote by $h_m(t)$ the time-aligned, oriented, and windowed sensor signals as produced by block 402, and evaluated at sample time t, $$h_m(t) = w(t) \cdot g_m(t+\tau_m) \beta_m;\ m=1,2,\ldots M \quad (2)$$

where w(t) represents the time window, which is zero outside the T-sample long duration of the aligned arrivals. Denote by $H_m$ the column of T samples of $h_m(t)$, $$H_m = [h_m(1) h_m(2) \ldots h_m(T)]^T \quad (3)$$

and by H the T×M matrix of time-aligned, oriented, and windowed sensor signals, $$H = [H_1 H_2 \ldots H_M] \quad (4)$$

The columns of the arrival waveform matrix H consist of sampled event waveforms $s_m(t)$ in a background of noise $n_m(t+\tau_m)$.

The event waveforms are expected to be similar sensor to sensor, and should be accurately represented by the weighted sum of a relatively small number of basis shapes. The noise, on the other hand, is expected to vary in an uncorrelated manner from sensor to sensor. In this way, embodiments decompose the arrival waveform matrix into signal and noise subspaces (for example, via singular value decomposition), and estimate the event waveforms at each sensor as that portion of the arrival waveform matrix H lying in the subspace associated with its few larger singular values.

Denoting by S the matrix of arrival waveforms, $$S = [s_1 s_2 \ldots s_M] \quad (5)$$

where $s_m$ is the vector of sensor m event waveform samples $s_m(t)$; t=1, 2, . . . T, embodiments model the arrival waveforms as $$\hat{S} = U_L W_L \quad (6)$$

where $U_L$ is an L-column matrix of T-long orthonormal waveform basis shapes, and $W_L$ is an M-column matrix of L-element weights. The basis waveform shapes and weights (i.e. the matrices U and V) can be found via singular value decomposition of H as performed in block 404. In one non-limiting example, singular value decomposition is performed using the MATLAB function call svd(H, 'econ'). The outputs of this function call using the matrix H formed using the outputs of block 402 can be expressed as:

$$UDV^T = H \quad (7)$$

where U is the T×M matrix of orthonormal basis shapes, D is an M×M diagonal matrix of singular values $d_l$; l=1, 2, . . . M, arranged largest to smallest, and V is an M×M orthonormal matrix of normalized weights.

In forming the model waveform basis shapes U and sensor weights W, it is desired to take into consideration the relative sensor SNRs, in particular, it is desired to give more weight to those sensors having larger SNRs. A weighted decomposition may be formed as follows. Denote by $\Sigma$ the sensor noise covariance matrix, e.g. a diagonal matrix of sensor noise variances. The matrix $H\Sigma^{-1}$ then weighs the columns of H by the respective sensor inverse variances. Performing a singular value decomposition on $H\Sigma^{-1}$ gives (after multiplying through by $\Sigma$), $$U_\Sigma D_\Sigma V_\Sigma^T \Sigma = H,$$

with the orthonormal $U_\Sigma$ being the waveform basis shapes, and $D_\Sigma V_\Sigma^T \Sigma$ being the sensor weights.

Using these matrices, in block 406, to estimate the sensor waveforms during the arrival, the order L is selected, and Equation (6) is used to construct the estimated waveforms, with $U_L$ being the first L columns of U, and $W_L$ being the first L rows of the product DV. (Note that the singular values D could be apportioned in any manner between U and $V^T$ in computing the waveform estimates.) In some sense, $\hat{S}$ reconstructs the event arrival waveforms without using the noise-like components.

Figure 6:
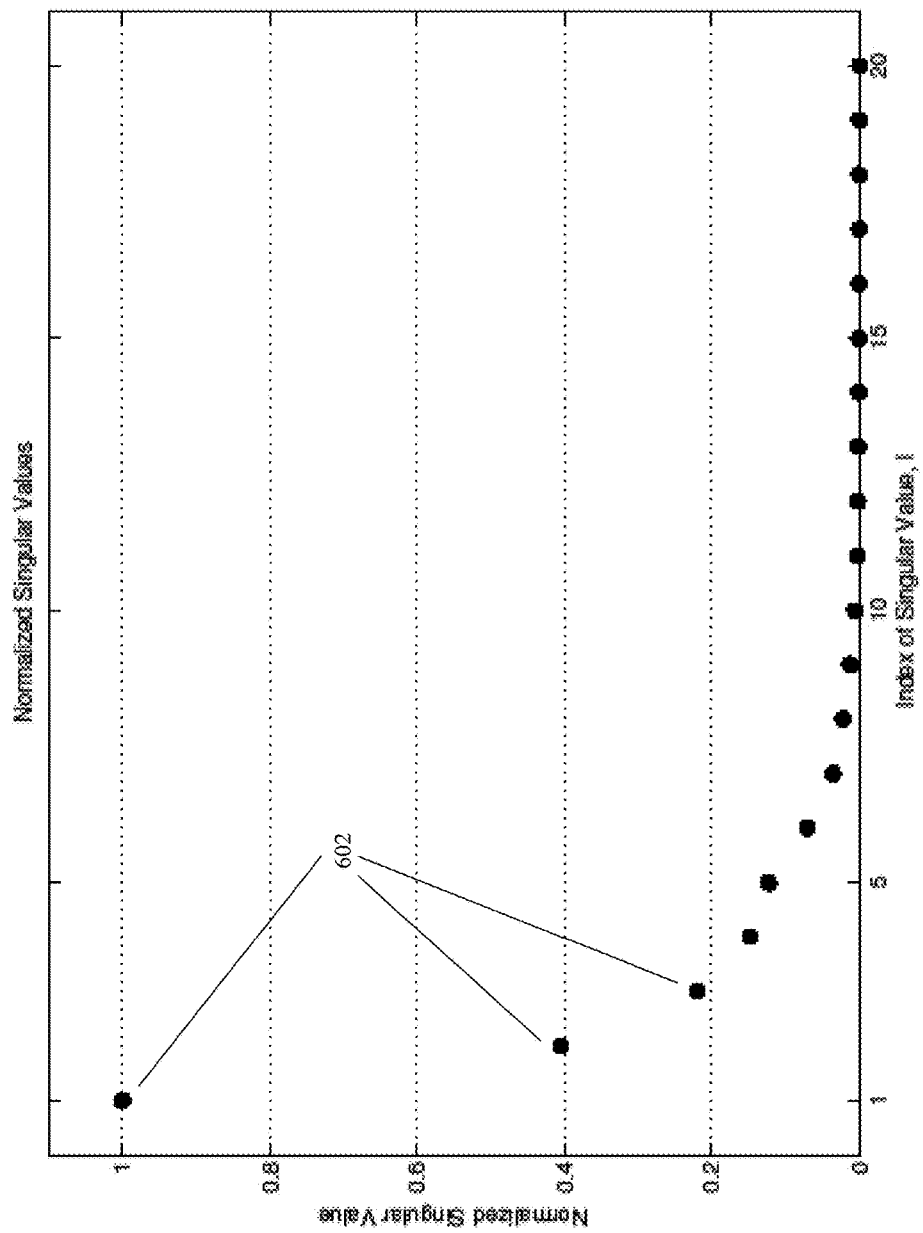
FIG. 6 is a plot illustrating normalized singular values that are obtained from a matrix formed from trace data such as that shown in FIG. 5.

As an example, FIG. 6 shows the singular values of the sensor signal matrix H produced using samples of the waveforms shown in FIG. 3. As can be seen, there are a handful of larger singular values 602, with the rest being similarly small. The few larger singular values 602 are associated with the arriving event waveforms; the others are associated with noise.

Figure 7:
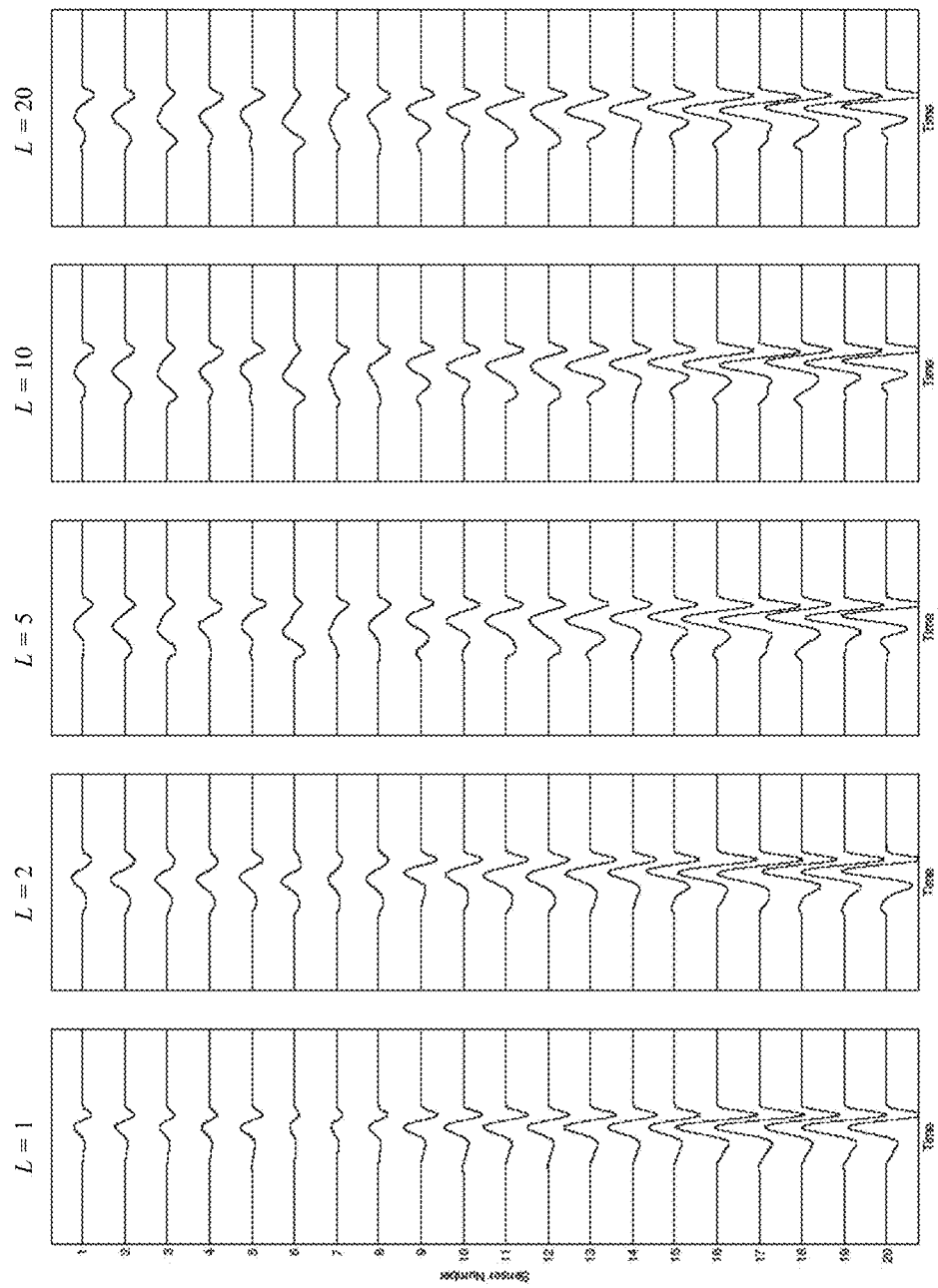
FIG. 7 are plots illustrating various orders of waveform estimates generated from processed trace data according to embodiments.
Figure 8:
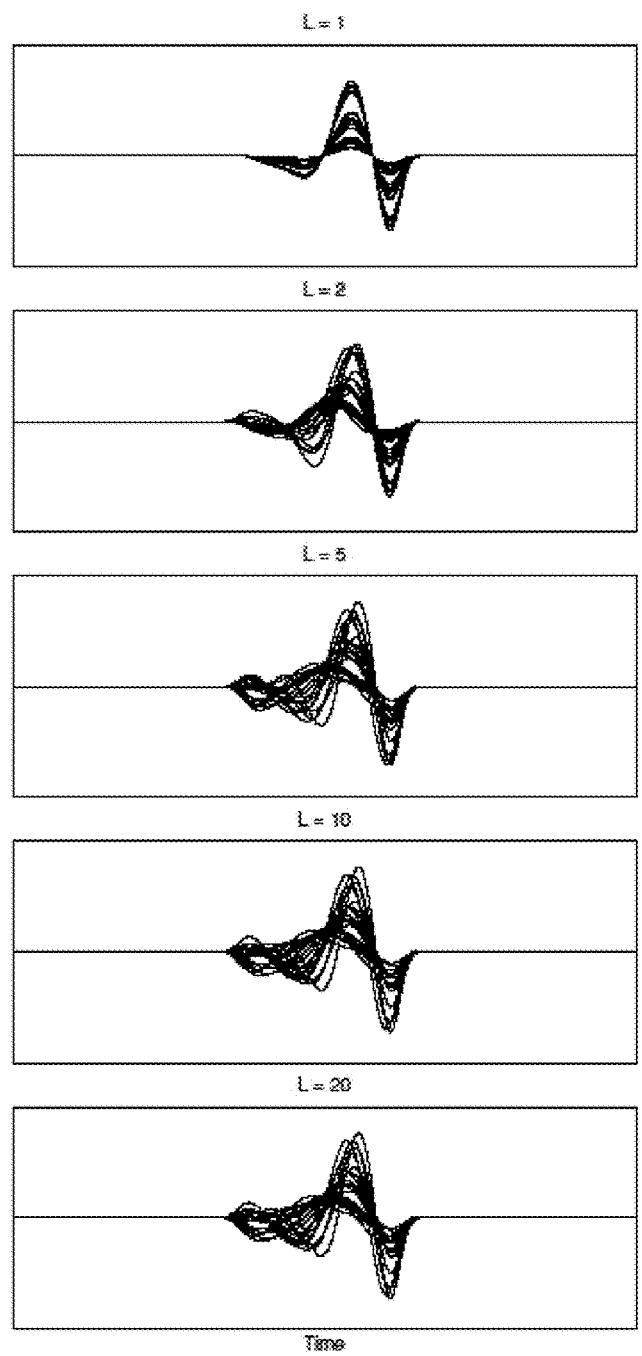
FIG. 8 are the plots from FIG. 7 shown as overlays for each of the orders.

FIG. 7 shows the estimated sensor arrival waveforms $\hat{S}$ formed from matrices U and W as described above using model orders L=1, 2, 5, 10 and 20 as a waterfall plot, and FIG. 8 shows the same estimated waveforms overlaid for each model order. Note that as the order decreases from the total number of sensors, L=M (which exactly reproduces the arrival waveform matrix H) to L=1, the noise energy is monotonically reduced, with the order 1 estimate $\hat{S}_1$ having roughly 1/M of the noise energy in the original traces H. Also note that with a model order of L=1, the estimated waveform shape (but not its amplitude) is unchanging from sensor to sensor. As the model order is increased, differences in waveform shape sensor-to-sensor become better modeled. Accordingly, to pick the model order, it is preferred to select the smallest order L that appears to capture the arrival waveform changes across the array. This can be done by comparing the estimated waveforms $\hat{S}$ and original sensor signals H. It can also be achieved by finding the order after which the singular value decreases significantly, i.e. the order L such that $d_L/d_{L+1}$ is relatively large.

Returning to the example embodiment shown in FIG. 4, while estimates of the arriving waveforms as generated in block 406 are useful in determining arrival parameters, additional or alternative processing can be performed using the matrices U, D and V output from block 404. For example, embodiments generate "cleaned" versions of the original trace data that has been similarly processed to preserve event arrival waveforms while reducing background noise. Note that the singular value decomposition above produces a time basis U and a sensor basis V. To "clean" an entire seismic record containing the wavefront arrival, the entire record may be projected onto the sensor basis.

First, in block 408, the first L columns of matrix V are obtained from the output of block 404.

Next, in block 408, embodiments generate time-aligned, oriented traces (essentially $h_m(t)$, but not windowed), $$k_m(t) = g_m(t+\tau_m)\beta_m; \ m=1,2,\ldots M \quad (8)$$

and form the matrix K using $k_m(t)$ as its t, mth row-column element. In this way, the entire duration of the traces is processed, not just the time window used to find V.

Then, in block 408, embodiments project the traces onto the first L columns of V, denoted $V_L$ to form the estimated traces $\check{R}$, using the following equation:

$$\check{R} = K V_L V_L^T \quad (9)$$

Note that the estimated traces $\check{R}$ will match the estimated arrival waveforms $\hat{S}$ in the arrival time window.

Figure 9:
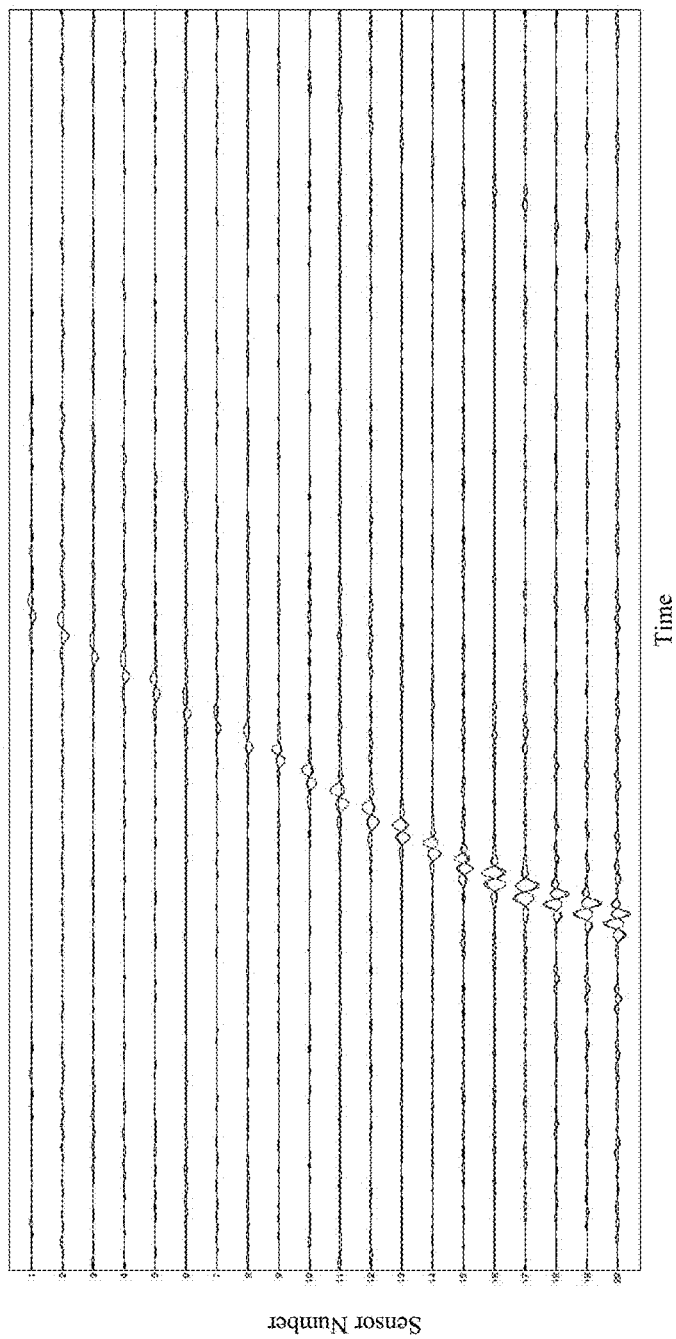
FIGS. 9 and 10 are plots illustrating clean traces that are generated using different orders according to embodiments.

Finally in block 410, the estimated waveforms $\check{R}$ are time shifted back to their original moveout using $\tau_m$, and each sensor signal is rotated according to its polarization using $\beta_m$ to generate multicomponent "cleaned" traces. As an example, processed versions of the raw trace data appearing in FIG. 2 are shown in FIG. 9, where the processed traces $\check{R}$ have been generated according to Equation (9) using V as constructed from the event arrival data H and with order L=2 (i.e. $V_2$). Note the P-wave arrival 902 is clearly visible, and that the seismic background 904 is suppressed.

Figure 10:
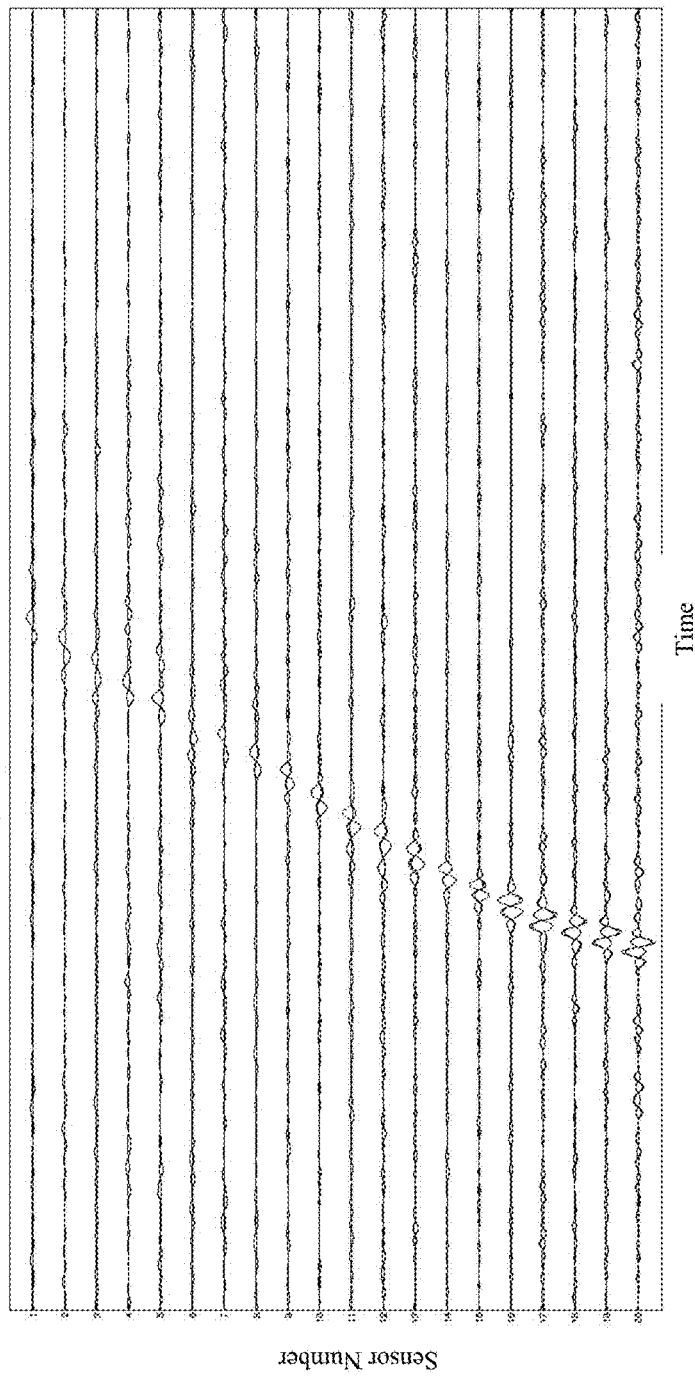

Trace estimates made using L=5 are shown in FIG. 10. Compared with the L=2 estimate, arrival waveform changes 1002 across the array are more closely tracked using the L=5 estimate; however, the seismic background 1004 is less suppressed.

One question concerns the nature of the waveform estimation errors in $\hat{S}$ or $\check{R}$. An expectation is that the estimation errors will be additive and noise-like as the estimates are constructed additively, and their errors are expected to result from including unwanted portions of additive noise in the signal basis or including noise subspace components by choosing an order L which is too large. Therefore, this process is not expected introduce systematic changes in the phase or magnitude of the arriving wavefronts. This seems to be the case, as evidenced by the similarity between the "cleaned" and bandpass filtered arrivals as the wavefront traverses the array in.

Figure 11:
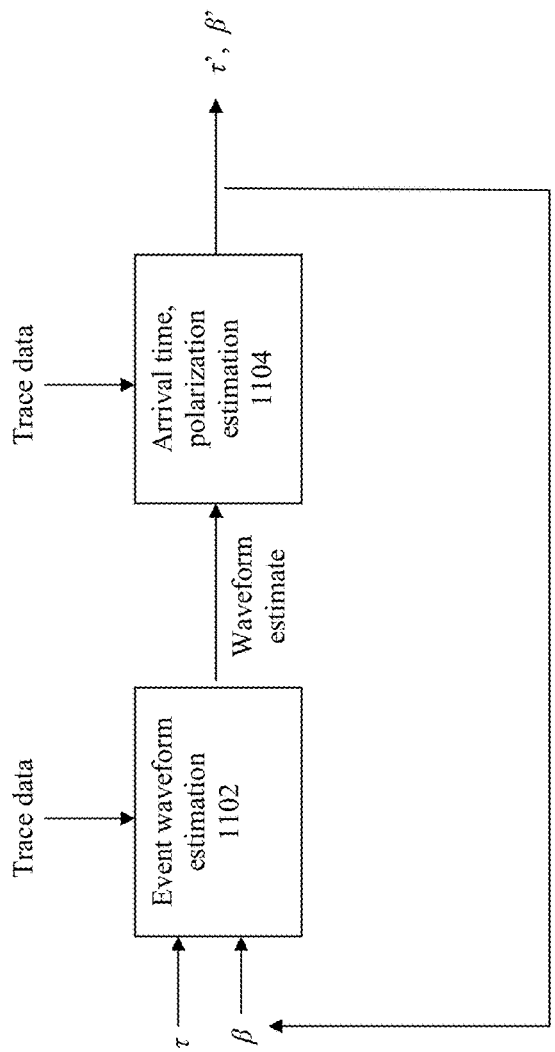
FIG. 11 is a functional block diagram illustrating another example system and method according to embodiments.

According to certain additional aspects, the estimated arrival waveforms can be used to generate improved event arrival-time and polarization estimates for each sensor in embodiments of the invention. FIG. 11 is a functional block diagram illustrating an example method and system according to these embodiments.

First, in block 1102, the estimated arrival waveforms $\hat{S}$ are generated as described above (e.g. in connection with blocks 402, 404 and 406).

Next, in block 1104, event arrival polarizations may be estimated using the projection of the estimated arrival waveforms S onto the corresponding sensor's multi-component trace data:

$$\rho_m = [g_m(1+\tau_m)^T \ldots g_m(T-\tau_m)^T]\hat{s}_m \quad (10)$$

$$\beta_m = \rho_m / \|\rho_m\| \quad (11)$$

where $\hat{s}_m$ is the estimated arrival waveform at the mth sensor.

Similarly, in block 1104, arrival times can be estimated by cross-correlating the estimated arrival waveforms with the corresponding sensor's trace data, preferably oriented according to the arrival polarization or the direction of maximum SNR, and finding the correlation lag at which the cross correlation is maximized. Note that these cross-correlations could also be performed using multi-component input trace data and the multi-component signal estimates made using the method described below directly, without reducing the data to a 1-dimensional signal per sensor.

The case of planar motion (two-dimensional $s_m(t)$ and m) may be accommodated by first solving for the first column of $\beta_{m1}$, then subtracting that direction $\hat{s}\beta_{m1}^T$ from $g_m$, and finally repeating the 1-D process with that first dimension of motion removed.

Improved event arrival waveform estimates may be found iteratively by first using the process above to estimate the arriving waveforms in block 1102, and then using those waveforms to form new arrival-time and polarization estimates in block 1104. As shown in FIG. 11, the new arrival times and polarizations are then used to generate a new set of arrival waveform estimates, and so on, for example, until the process converges, or for a given number of iterations.

According to still further aspects, another embodiment of the invention forms the arrival waveform matrix without first combining multi-component sensor signals to produce a reduced-dimension signal for each sensor such as a single, directionally oriented trace for each sensor. Denote by $\hat{h}_m(t)$ the time-aligned and windowed component signals of sensor m, evaluated at sample time t, $$\hat{h}_m(t) = w(t) \cdot g_m(t+\tau_m); \ m=1,2,\ldots M \quad (12)$$

where $w(t)$ represents the time window, which is zero outside the T-sample long duration of the aligned arrivals. For a collection of sensors each having N components, denote by $\hat{H}$ the T×NM matrix of time-aligned and windowed multi-component sensor signals, $$\hat{H} = \begin{bmatrix} \tilde{h}_1(1) & \tilde{h}_2(1) & \ldots & \tilde{h}_M(1) \\ \vdots & \vdots & \vdots & \vdots \\ \tilde{h}_1(T) & \tilde{h}_2(T) & \ldots & \tilde{h}_M(T) \end{bmatrix} \quad (13)$$

where the multi-component arrival waveform matrix $\hat{H}$ is N-times as wide as the oriented arrival waveform matrix H.

To estimate the event arrival waveforms, the multi-axis waveform matrix is split into signal and subspace matrices. As above, a singular value decomposition can be used, $$\dot{U}\check{D}\tilde{V}^T = \hat{H} \quad (14)$$

with $\dot{U}$, $\check{D}$ and $\tilde{V}$ being the orthonormal basis shapes, diagonal matrix of singular values (arranged largest to smallest), and orthonormal matrix of normalized weights. As above, the multi-component arriving wavefront signal may be estimated using a given number of singular values L, $$\hat{S} = \dot{U}_L \dot{W}_L \quad (15)$$

where $\dot{U}^L$ is the matrix made from the first L columns of $\dot{U}$, and $\dot{W}_L$ is the first L rows of $\check{D}\hat{V}^T$. Similarly, any duration of trace data may be projected onto the columns of $\hat{V}_L$ (as above) to estimate the arrival signal from an entire record.

Note that the N columns of $\hat{W}_L$ associated with a given sensor are likely to have a rank which is the lesser of N and L. Accordingly, when L>1, the different waveform shapes specified by $\hat{U}_L$ will be added in different proportions to estimate the arrival waveform along each component of a sensor. However, a P-wave arrival has motion along only the arrival direction; an S-wave arrival can involve motion only in the plane perpendicular to the arrival direction. As a result, it is preferred to replace the columns of $\hat{W}_L$ associated with each sensor by either a rank-one or rank-two approximation, depending on the arrival type, for instance found by singular value decomposition of each sensor's L×N portion of $\hat{W}$. Note that the row space of this rank-one or rank-two approximation can be used as an estimate of the arrival polarization. Finally, note that this procedure may be applied in the case that different sensors within the array have varying number of components.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A method of analyzing a microseismic event, comprising:
   receiving a plurality of traces associated with the microseismic event that were respectively generated by a plurality of sensors disposed underground;
   processing the plurality of traces to obtain a respective plurality of sets of samples that are time-aligned in accordance with a respective estimate of arrival time of a wavefront associated with the microseismic event at each of the plurality of sensors; and
   decomposing the plurality of sets of samples into a respective plurality of sets of one or more basis waveform shapes and corresponding sensor weights to form an estimate of the wavefront at the sensors while suppressing background noise associated with the traces,
   wherein the plurality of traces are associated with a microseismic survey of a subsurface region, and wherein the estimate of the wavefront associated with the microseismic event assists in analyzing the microseismic survey.

2. A method according to claim 1, wherein each of the plurality of traces includes two or more trace components, and wherein processing includes combining together the two or more trace components to form a respective single trace for each of the plurality of sensors from the two or more components.

3. A method according to claim 2, wherein combining is performed in accordance with an estimate of an orientation between the respective sensor and the microseismic event.

4. A method according to claim 2, wherein combining is performed in accordance with an estimate of an orientation at which SNR of the single trace is maximized.

5. A method according to claim 1, wherein processing includes windowing each of the plurality of traces around the estimated arrival time of the wavefront at the respective sensor to obtain the respective set of samples.

6. A method according to claim 1, further comprising correlating the estimate of the wavefront with the plurality of traces to re-estimate the respective arrival times for each of the sensors.

7. A method according to claim 6, further comprising estimating the respective arrival times.

8. A method of analyzing a microseismic event, comprising:
   receiving a plurality of traces associated with the microseismic event that were respectively generated by a plurality of sensors disposed underground;
   processing the plurality of traces to obtain a respective plurality of sets of samples that are time-aligned in accordance with a respective estimate of arrival time of a wavefront associated with the microseismic event at each of the plurality of sensors; and
   decomposing the plurality of sets of samples into a respective plurality of sets of one or more basis waveform shapes and corresponding sensor weights; and
   forming cleaned versions of the plurality of traces using some of the respective plurality of sets of sensor weights,
   wherein the plurality of traces are associated with a microseismic survey of a subsurface region, and wherein the cleaned versions of the plurality of traces assists in analyzing the microseismic survey.

9. A method according to claim 8, wherein forming includes:
   projecting the plurality of traces into a sensor basis in accordance with the plurality of corresponding weights.

10. A method according to claim 9, wherein forming further includes:
    time shifting the projected plurality of traces in accordance with the estimated respective arrival times for the plurality of sensors.

11. A system for analyzing a microseismic event, comprising:
    an input for receiving a plurality of traces associated with the microseismic event that were respectively generated by a plurality of sensors disposed underground;
    an alignment block that is adapted to process the plurality of traces to obtain a respective plurality of sets of samples that are time-aligned in accordance with a respective estimate of arrival time of a wavefront associated with the microseismic event at each of the plurality of sensors; and
    a decomposition block that is adapted to decompose the plurality of sets of samples into a respective plurality of sets of one or more basis waveform shapes and corresponding sensor weights to form an estimate of the wavefront at the sensors while suppressing background noise associated with the traces,
    wherein the plurality of traces are associated with a microseismic survey of a subsurface region, and wherein the estimate of the wavefront associated with the microseismic event assists in analyzing the microseismic survey.

12. A system according to claim 11, wherein each of the plurality of traces includes two or more trace components, and wherein the alignment block is further adapted to combine together the two or more trace components to form a respective single trace for each of the plurality of sensors from the two or more components.

13. A system according to claim 12, wherein combining is performed in accordance with an estimate of an orientation between the respective sensor and the microseismic event.

14. A system according to claim 12, wherein combining is performed in accordance with an estimate of an orientation at which SNR of the single trace is maximized.

15. A system according to claim 11, wherein the alignment block is further adapted to window each of the plurality of traces around the estimated arrival time of the wavefront at the respective sensor to obtain the respective set of samples.

16. A system according to claim 11, further comprising a correlation block that is adapted to correlate the estimate of the wavefront with the plurality of traces to re-estimate the respective arrival times for each of the sensors.

17. A method according to claim 1, wherein the processing and decomposing are performed by a computer.

18. A method according to claim 1, further comprising:
 presenting the estimated wavefront by forming a new plurality of traces for the respective plurality of sensors with the background noise suppressed.

\* \* \* \* \*